United States Patent [19]

Takayanagi

[11] Patent Number: 5,027,274
[45] Date of Patent: Jun. 25, 1991

[54] METHOD AND SYSTEM FOR MANAGING A PROCESS OF IMAGE DATA ACQUIRED BY A COMPUTED RADIOGRAPHY TECHNIQUE AND ADDITIONAL INFORMATION ADDED TO THE IMAGE DATA

[75] Inventor: Noboru Takayanagi, Nishinasunomachi, Japan

[73] Assignee: Kabushiki Kaisha Toshiba, Kawasaki, Japan

[21] Appl. No.: 257,677

[22] Filed: Oct. 14, 1988

[30] Foreign Application Priority Data

Oct. 16, 1987 [JP] Japan .................................. 62-259626

[51] Int. Cl.⁵ .......................................... G01N 23/04
[52] U.S. Cl. ............................. 364/413.19; 250/327.2
[58] Field of Search ...................... 364/413.13, 413.23, 364/413.19; 250/327.2 C, 327.2 D, 327.2 B, 327.2 A, 327 C, 327 D; 378/62

[56] References Cited

U.S. PATENT DOCUMENTS

| | | | |
|---|---|---|---|
| 4,259,721 | 3/1981 | Kuznia | 364/413.15 |
| 4,494,141 | 1/1985 | Altekruse | 364/413.15 |
| 4,520,442 | 5/1985 | Grimberg et al. | 364/413.13 |
| 4,625,171 | 11/1986 | Sekihara et al. | 324/312 |
| 4,789,782 | 12/1988 | Ohara | 250/372.2 C |

FOREIGN PATENT DOCUMENTS 2165069A 4/1986 United Kingdom .
2187615A 9/1987 United Kingdom .

*Primary Examiner*—Jerry Smith
*Assistant Examiner*—Kim Thanh Tbui
*Attorney, Agent, or Firm*—Finnegan, Henderson, Farabow, Garrett and Dunner

[57] ABSTRACT

In a CR (computed radiography) system having a plurality of subsystems, X-ray image data acquired by an X-ray photographing apparatus is stored in an IP (imaging plate). The X-ray image data stored in the IP is read by an image reading apparatus. IP information is input by an IP information input apparatus, and stored in an image processing and control apparatus and a management apparatus. When IP information corresponding to X-ray image data read by the image reading apparatus is stored in the image processing and control apparatus, and IP process for a case of operating a single subsystem is performed. When the IP information is not stored in the image processing and control apparatus, IP information stored in the management apparatus is retrieved. When the IP information corresponding to the X-ray image data is detected in the management apparatus, the IP process is performed in accordance with the detected IP information.

11 Claims, 9 Drawing Sheets

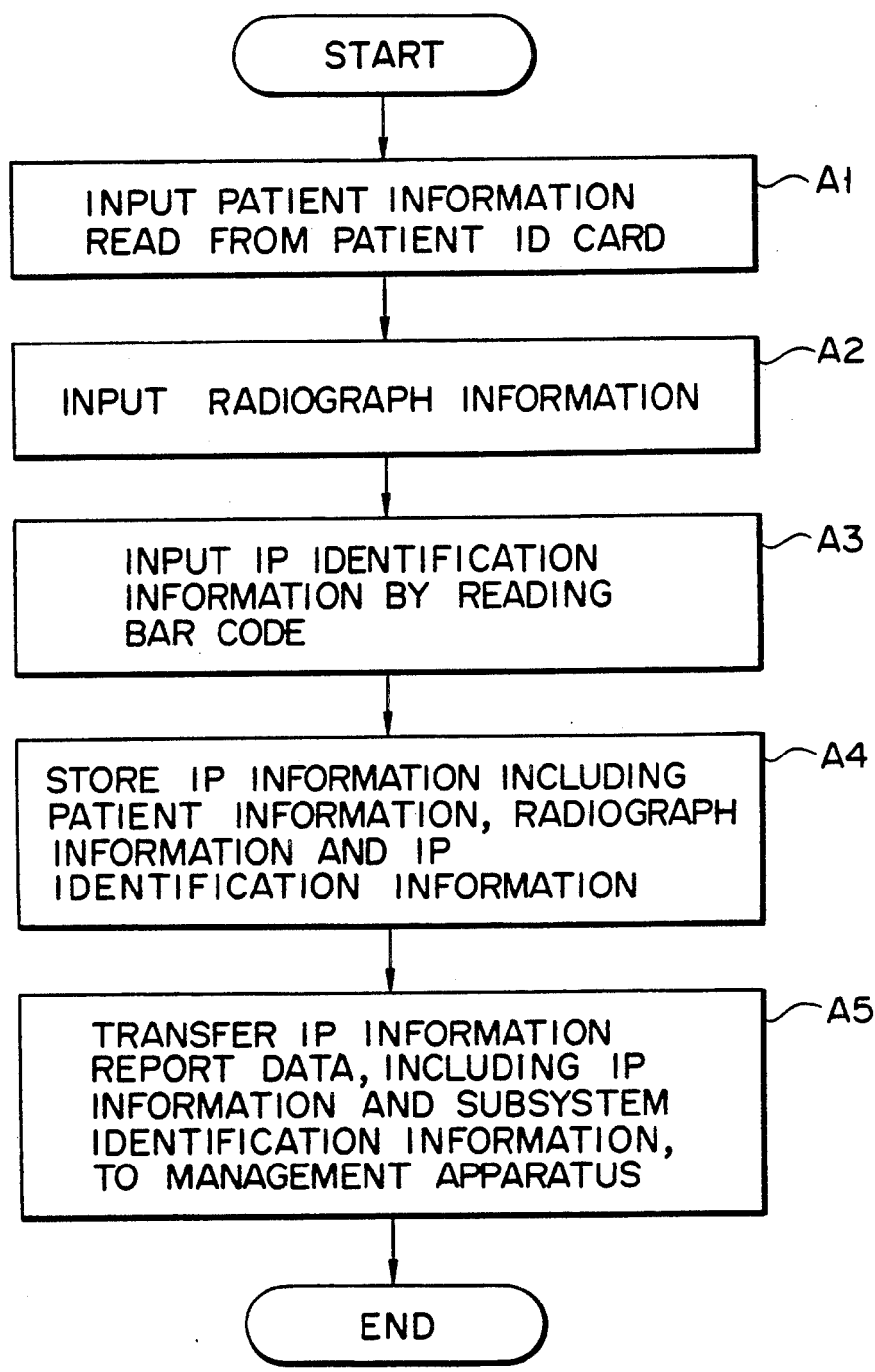
F I G. 5

METHOD AND SYSTEM FOR MANAGING A PROCESS OF IMAGE DATA ACQUIRED BY A COMPUTED RADIOGRAPHY TECHNIQUE AND ADDITIONAL INFORMATION ADDED TO THE IMAGE DATA

BACKGROUND OF THE INVENTION

1. Field of the Invention

The present invention relates to a method and system for managing a process of image data acquired by a computed radiography (CR) technique and additional information added to the image data.

2. Description of the Related Art

In recent years, a medical image diagnosis by a CR technique using an imaging plate (to be referred to simply as an IP hereinafter) has become popular. FIG. 1 shows an example of a system based on the CR technique. This system comprises X-ray radiographing apparatus 1, image reading apparatus 2, image processing apparatus 3, and image reproduction and recording apparatus 4. X-ray radiographing apparatus 1 has an X-ray tube for radiating X-rays onto an object to be examined, and a first recording medium (e.g., an IP.) for accumulating X-rays passing through the object as energy. Image reading apparatus 2 performs scanning using excited light having a wavelength of 500 to 800 nm on the IP to excite the energy accumulated on the IP, thereby causing the IP to radiate light having a wavelength of 300 to 700 nm. The light radiated from the IP within a predetermined wavelength range is received by a photodetector (e.g., a photomultiplier, photodiode, or the like). After an image is read by image reading apparatus 2, image processing apparatus 3 subjects the image to frequency enhancement processing and gray scale processing. The processed result is stored in an image memory or the like. Image reproduction and recording apparatus 4 sequentially reads out image data stored in the image memory. The image data is converted to an analog signal by a D/A converter, and the analog signal is converted to a light signal using a recording light source. The light signal is radiated onto a second recording medium (e.g., a radiographing film) through a lens system, thus forming a corresponding image on the recording medium. The image formed on the second recording medium by the CR system can be used for medical diagnosis of the examined object.

The detailed arrangement of the above-mentioned CR system will be described below.

In FIG. 2, subsystem 5 is constituted by image reading apparatus 2, image processing and control apparatus 10, image monitor 7, image reproduction and recording apparatus 4, and a plurality of IP information input apparatuses 9a, ..., 9n. IP cassette 6 having an IP used for a radiographing operation by X-ray radiographing apparatus 1 shown in FIG. 1 is set in image reading apparatus 2. Each IP is taken out from IP cassette 6, and image data stored in this IP is read out in accordance with image reading conditions determined by in advance IP information (to be described later), including radiograph information and patient information input from IP information input apparatuses 9a, ..., 9n. The image data is input to image processing and control apparatus 10, and is subjected to frequency enhancement processing, gray scale processing, and the like.

The image data processed by image processing and control apparatus 10 is displayed on image monitor 7 to be observed by an operator, and is transferred to image reproduction and recording apparatus 4. Image reproduction and recording apparatus 4 records the image data on recording medium 8. IP information input by IP information input apparatuses 9a, ..., 9n is recorded on recording medium 8.

The image data displayed on image monitor 7 is normally used after the above-mentioned processing for a radiographic technician to determine whether or not positioning of IP cassette 6 used for X-ray radiographing with respect to the object is appropriate. If the positioning of IP cassette 6 with respect to the object is not appropriate, a radiographing operation is restarted.

The image data input to image reproduction and recording apparatus 4 is converted to the analog signal by the D/A converter, as described above, and the analog signal is converted to a light signal by the recording light source. Thereafter, an X-ray image is formed on recording medium 8 using the light signal. Recording medium 8 is fed to an automatic developing machine (not shown) and is subjected to development and fixing, thus obtaining a hard copy of the X-ray image.

The above system is equipped in, e.g., a CR room. Image reading apparatus 2, image processing and control apparatus 10, and image reproduction and recording apparatus 4 are synchronously operated. Their operation speed is determined by the image reading apparatus 2 which has the slowest operation speed.

The image processing and control apparatus 10 operates at a speed which is at least two times the operation speed of the image reading apparatus 2. Since the operation speed of the image reading apparatus 2 is dependent upon the physical characteristics of the IP (response of reading), the operation speed cannot be improved.

In the conventional system, in order to improve a throughput, e.g., to increase the number of IPs to be processed per hour, a system as shown in FIG. 1 is extended, as needed.

However, when a plurality of systems are extended, IP information is input to the subsystem capable of reading image data, as shown in FIG. 2, and a radiographed IP must be input to and processed by the corresponding subsystem. More specifically, since radiograph information included in the IP information changes for every radiographing operation, an operator must determine the subsystem to which the IP information input apparatus, equipped near the X-ray radiographing apparatus, is currently connected, and must input the IP to the image processing and control apparatus of the selected subsystem without failure.

If the IP is processed in another subsystem, the IP information must be re-input, resulting in a cumbersome operation.

In a plurality of X-ray radiographing apparatuses, when a radiographing operation is performed too frequently and beyond the processing capacity of a given subsystem, the radiographed IPs form a queue for processing. More specifically, if unprocessed IPs are concentrated on a given subsystem, there is a long wait time for processing. This is true even if the wait time of other subsystems is short because IP processing cannot be independently performed in other subsystems. Therefore, if a plurality of subsystems are extended, the throughput of the system as a whole cannot be satisfactorily improved since a variation in wait time occurs.

Additionally, if an image reading apparatus of a subsystem malfunctions and cannot read an image, IPs must be processed in another subsystem. However, since IP information input may occur before the apparatus malfunctions IP information cannot be used by another subsystem, and the IP information must be re-input in order to process IPs in a subsystem capable of reading.

As described above, a demand has arisen for an apparatus which can improve the throughput of a system as a whole by efficiently processing IPs.

SUMMARY OF THE INVENTION

It is an object of the present invention to provide a method and system for managing a process of image data acquired by a computed radiography technique and additional information added to the image data.

According to one aspect of the present invention, there is provided a system for managing a process of image data acquired by a computed radiography technique and additional information added to the image data, the system comprising: a plurality of subsystems for storing the additional information corresponding to the image data, and processing the image data in accordance with the stored additional information; and management means for storing the additional information stored in the subsystems, and managing the subsystems in accordance with the additional information.

According to another aspect of the present invention, there is provided a method for managing a process of image data acquired by a computed radiography technique and additional information added to the image data, the method comprising the step of: acquiring the image data by photographing a subject; inputting the additional information; detecting the additional information corresponding to the acquired image data; and processing the image data in accordance with the detected additional information.

BRIEF DESCRIPTION OF THE DRAWINGS

FIG. 5 is a flow chart showing IP information input processing in a subsystem shown in FIG. 3;

DETAILED DESCRIPTION OF THE PREFERRED EMBODIMENTS

A first embodiment of the present invention will be described hereinafter with reference to the accompanying drawings.

Figure 1:
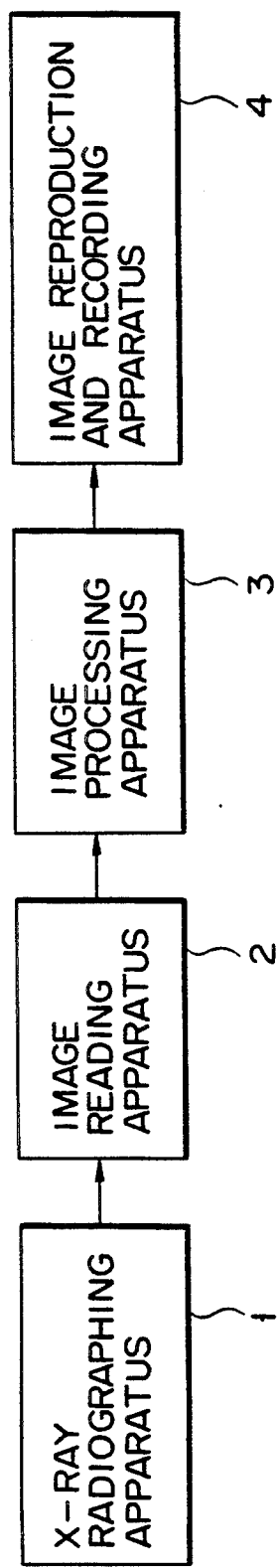
FIG. 1 is a block diagram showing an arrangement of a conventional CR system.
Figure 2:
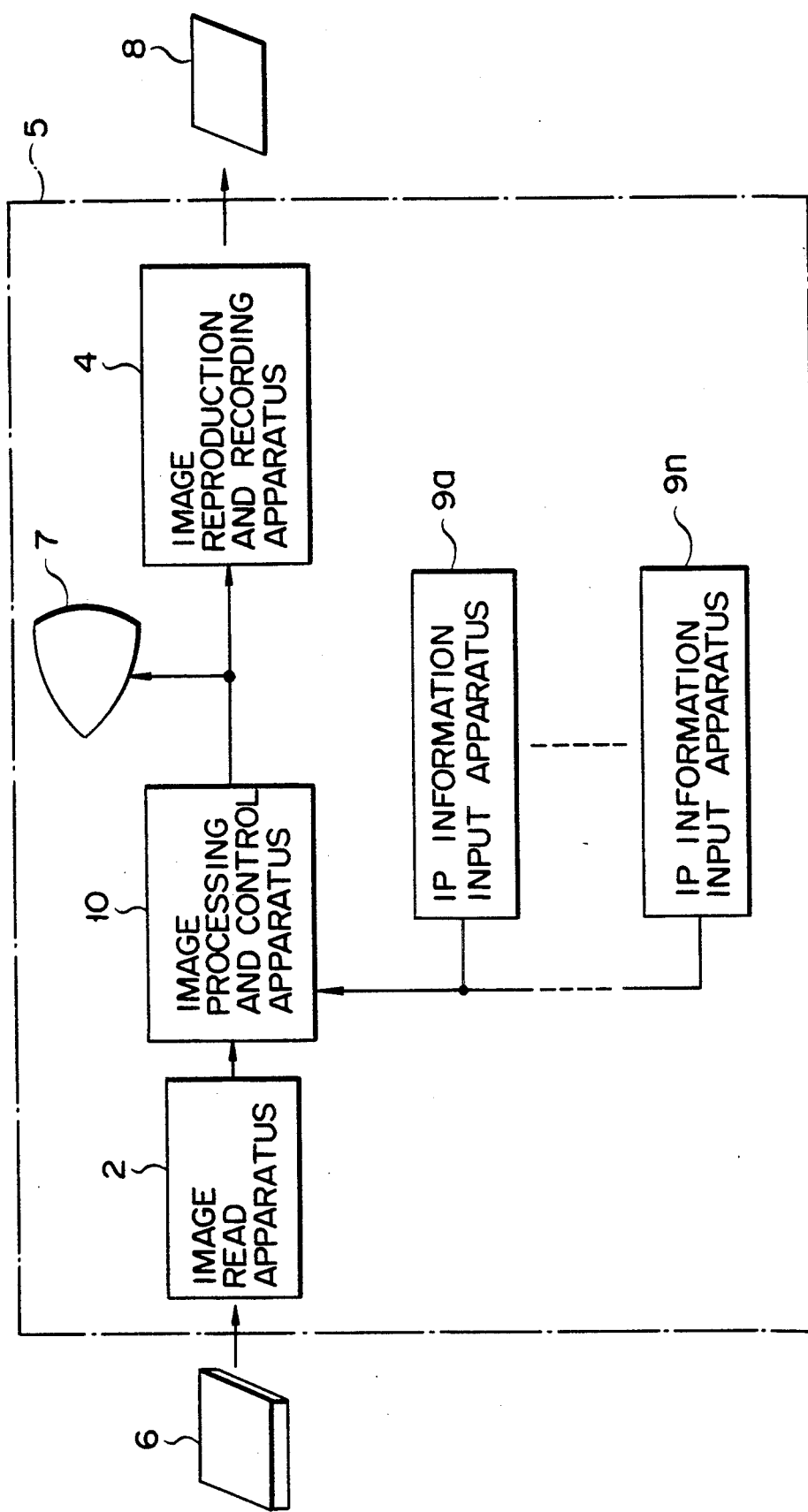
FIG. 2 is a block diagram showing a detailed arrangement of the CR system shown in FIG. 1.
Figure 3:
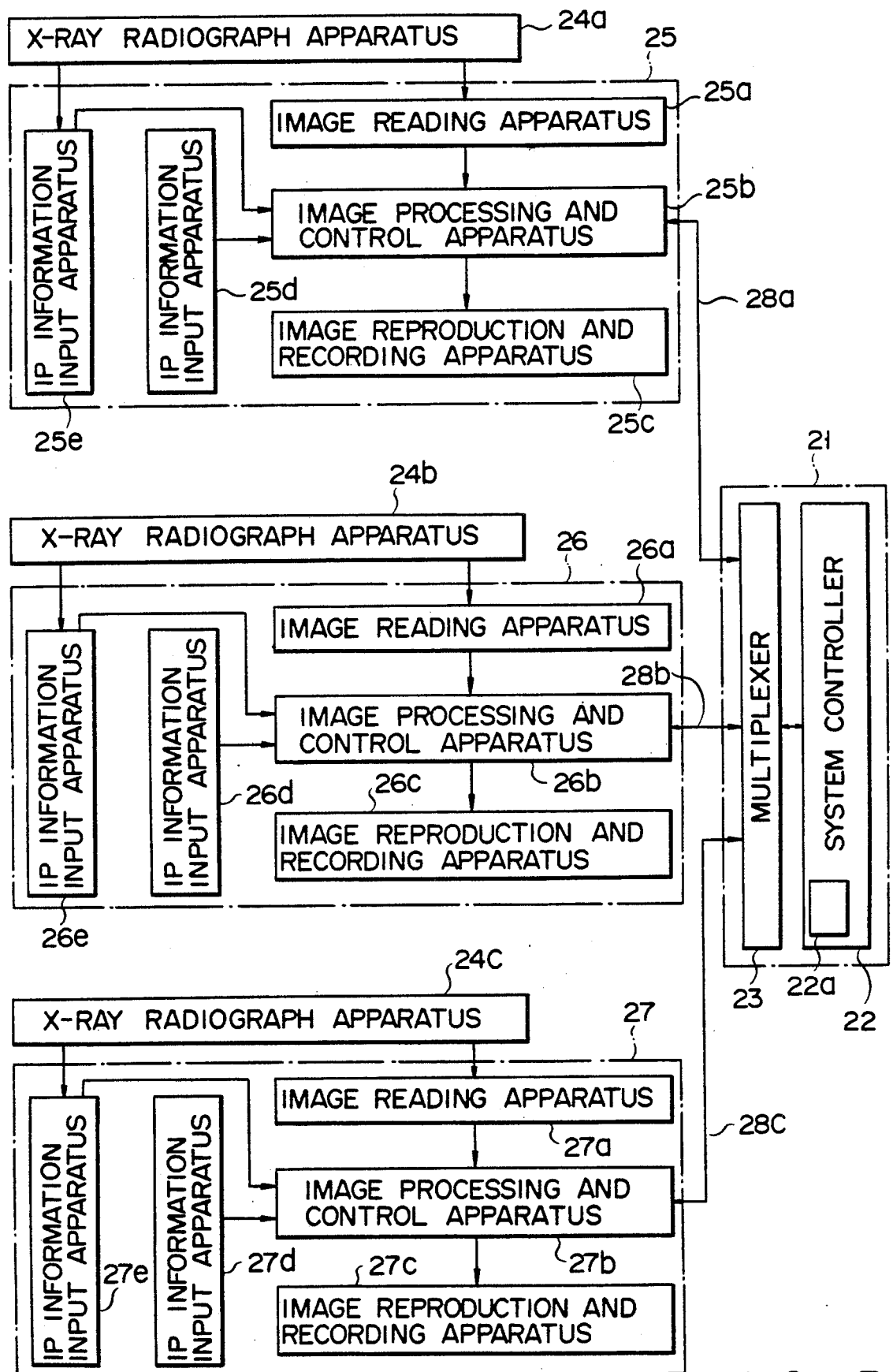
FIG. 3 is a block diagram showing an arrangement of a CR system according to a first embodiment of the present invention.

In FIG. 3, the system comprises management apparatus 21, X-ray radiograph apparatuses 24a to 24c, and subsystems 25 to 27. Subsystems 25 to 27 have image reading apparatuses 25a to 27a, image processing and control apparatuses 25b to 27b, image reproduction and recording apparatuses 25c to 27c, and IP information input apparatuses 25d to 27d and 25e to 27e. Management apparatus 21 and subsystems 25 to 27 are connected through transmission paths 28a to 28c.

For example, in subsystem 25, radiograph information, IP identification information generated in X-ray radiograph apparatus 24a and patient information are input to image processing and control apparatus 25b. IP information including IP identification information, radiograph information, and patient information is stored in image processing and control apparatus 25b in correspondence with IPs.

IP identification information is information which is not repeatedly used in a whole system in order to distinguish a large number of IPs. The IP identification information is printed on each IP in the form of a bar code, and is input by a bar code reader of IP information input apparatus 25e.

Radiograph information includes radiographing conditions when an object to be examined is radiographed, e.g., a portion to be radiographed, a radiographing method (general radiography, contrast medium radiography, macroradiography, tomography, and the like), a radiograph IP size, division radiograph information, a radiograph date and time, an X-ray tube voltage, an X-ray tube current, a radiation period, and the like, and is input by IP information input apparatus 25e in an on-line mode.

Patient information is information associated with each radiographed IP, e.g., an ID number, a name, a date of birth, a gender, and the like of a patient, and is input by IP information input apparatus 25d in the form of a patient ID card issued to the patient.

The above-mentioned IP information is transferred from IP information input apparatuses 25d and 25e to image processing and control apparatus 25b, and is stored therein. Identification information of subsystem 25 and IP information are combined, and the combined information is transferred from image processing and control apparatus 25b to management apparatus 21 through transmission path 28a as IP information report data and is stored in apparatus 21. Note that image processing and control apparatus 25b and management apparatus 21 comprise, e.g., microprocessors.

A plurality of subsystems 25, 26, and 27 are connected to multiplexer 23 in management apparatus 21 through transmission paths 28a to 28c, and their data transmission, processing, and storage operations are controlled by system controller 22. Note that system controller 22 has memory 22a for storing IP information and identification information of the subsystems.

Multiplexer 23 is used as an interface for performing data transmission to the subsystems. In multiplexer 23, when transmission paths 28a to 28c respectively correspond to subsystems 25 to 27, identification information from each subsystem can be used for distinguishing subsystems 25 to 27, and eliminates a prestoring of subsystem identification information in image processing and control apparatuses 25b to 27b.

Figure 4A:
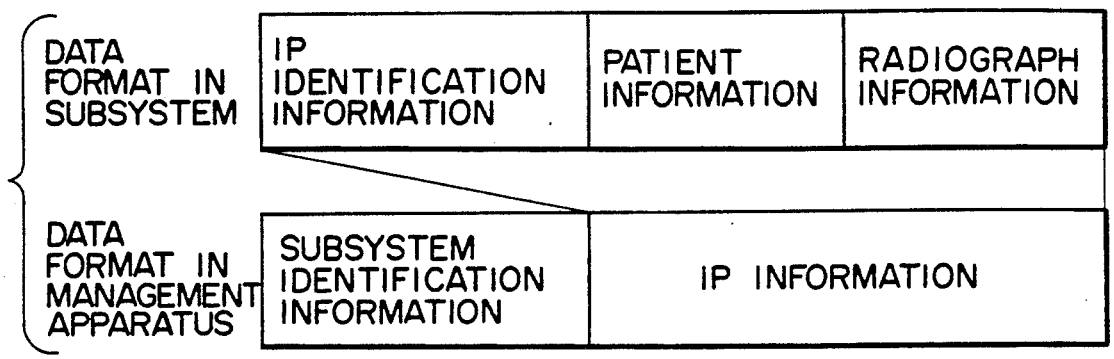
FIGS. 4A and 4B are views showing formats of IP information and transmission data.
Figure 4B:
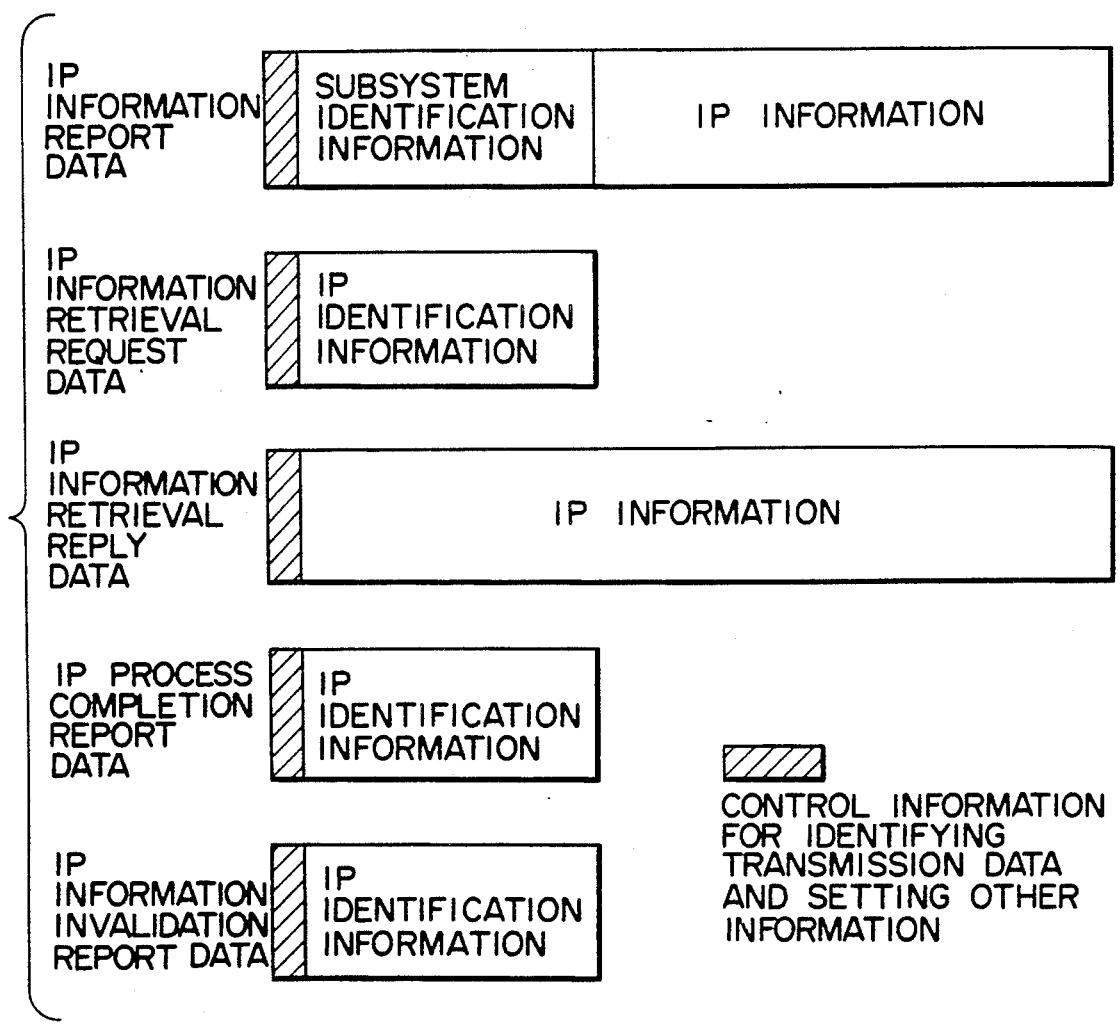

IP information transmitted to system controller 22 is stored in memory 22a in the format shown in FIG. 4A. FIG. 4B illustrates the data format of transmission data.

The operation of the system according to the first embodiment will be described below with reference to the flow charts shown in FIGS. 5 to 8.

FIG. 5 is a flow chart of IP information processing.

In step A1, patient information is input from a given IP information input apparatus to the corresponding image processing and control apparatus using a patient ID card. In step A2, radiograph information is input from a given IP information input apparatus to the corresponding image processing and control apparatus. In step A3, a bar code printed on an IP is read by a bar code reader of the IP information input apparatus, and the IP identification information is input to the image processing and control apparatus.

In step A4, IP information including patient information, radiograph information, and IP identification information is stored in the image processing and control apparatus. In step A5, IP information report data including IP information and subsystem identification information stored in the image processing and control apparatus is transferred to the management apparatus.

With the above operation, the IP information is stored in the corresponding subsystem and the management apparatus.

Figure 6:
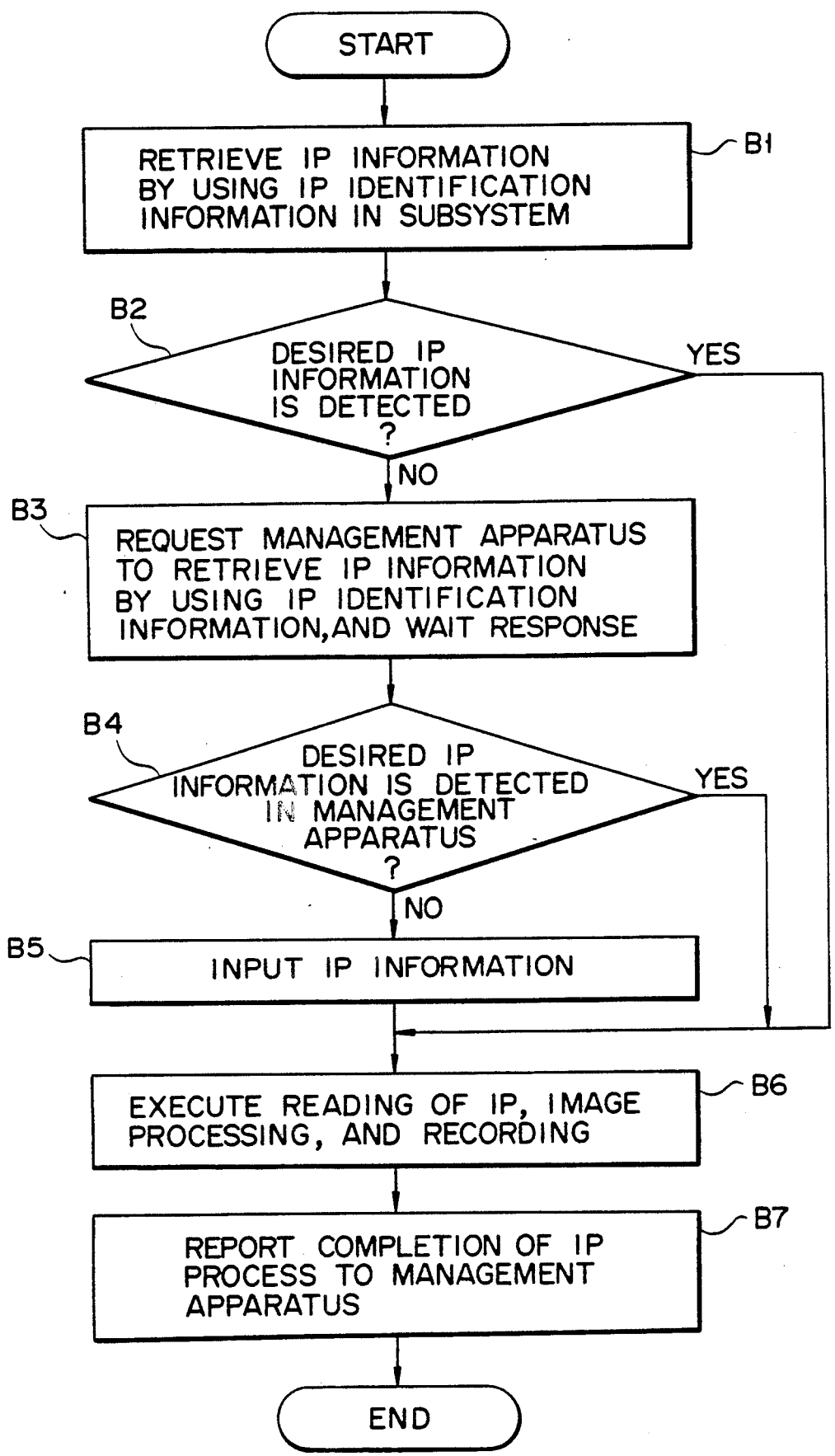
FIG. 6 is a flow chart showing IP processing in a subsystem.

FIG. 6 is a flow chart showing IP processing in each subsystem.

In step B1, IP information stored in the image processing and control apparatus is retrieved using the IP identification information. If desired IP information is detected in step B2, reading, image processing, and recording of an IP corresponding to the IP information are performed (step B6), and thereafter, in step B7, it is reported to the management apparatus that the processing of IP shown in step B6 is completed.

If desired IP information cannot be detected in step B2, retrieval of IP information in the management apparatus is requested by the image processing and control apparatus (step B3). It is checked in step B4 if desired IP information is detected in the management apparatus. If YES in step B4, processing in steps B6 and B7 is performed, as described above.

If NO in step B4, IP information input processing shown in FIG. 5 is performed (step B5), and thereafter, the processing in steps B6 and B7 is performed.

With the above operation, IP processing in each subsystem is performed.

Figure 7:
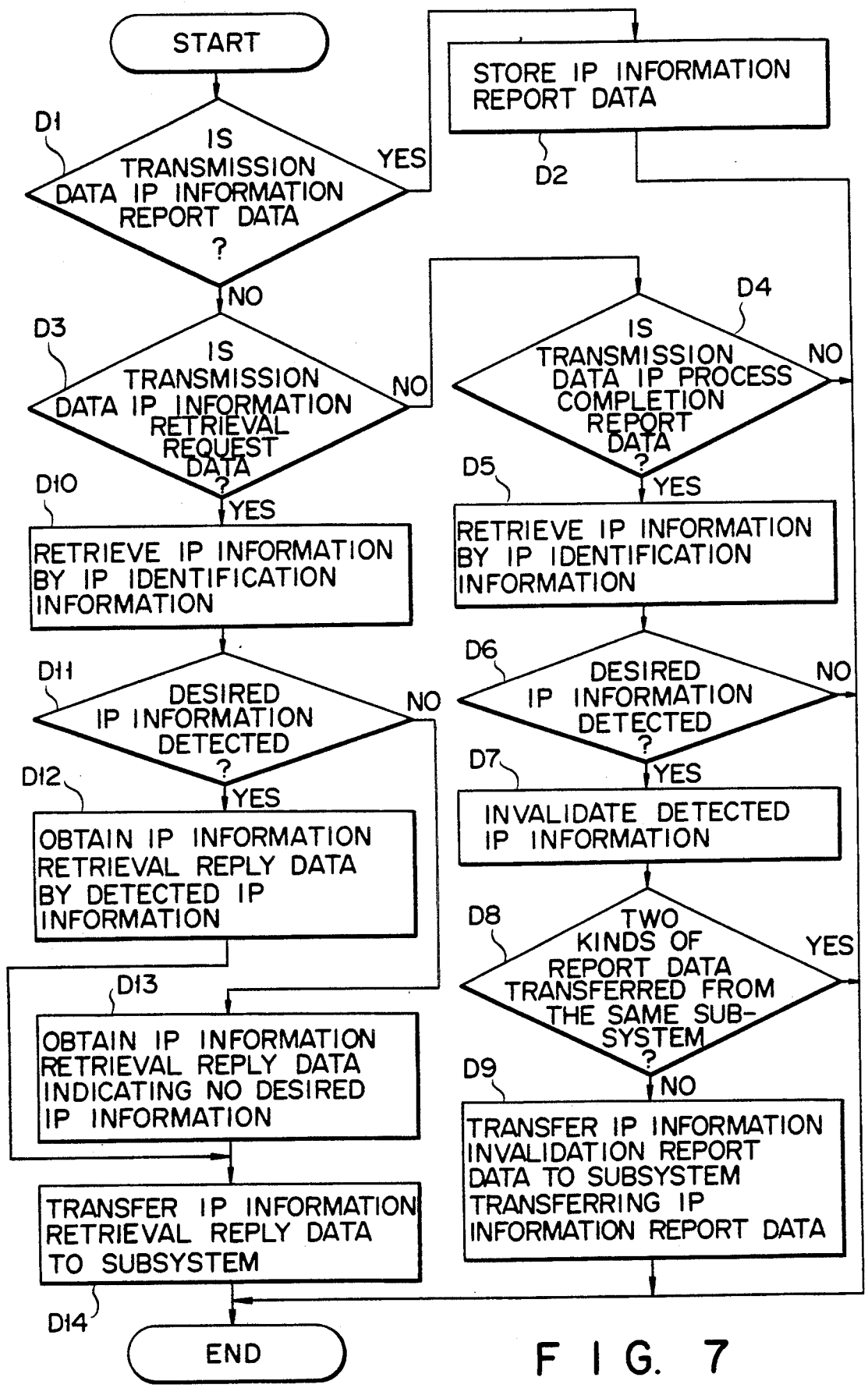
FIG. 7 is a flow chart showing transmission data processing in a management apparatus.

FIG. 7 is a flow chart showing transmission data processing in the management apparatus.

It is checked in step D1 if transmission data from the subsystem is IP information report data. If YES in step D1, the transmission data is stored in the management apparatus as the IP information report data (step D2).

If NO in step D1, it is determined if the transmission data is IP information retrieval request data (step D3). If NO in step D3, it is checked in step D4 if the transmission data is IP process completion report data.

If YES in step D4, the IP information stored in the management apparatus is retrieved using the IP identification information (step D5). If NO in step D4, transmission data processing in the management apparatus is completed.

It is checked in step D6 if desired IP information is detected in the management apparatus. If YES in step D6, detected IP information is invalidated (step D7). If NO in step D6, transmission data processing in the management apparatus is completed.

It is checked in step D8 if two kinds of report data, i.e., IP information report data and IP process completion report data are transferred from the same subsystem. If NO in step D8, IP information invalidation report data is transferred to the subsystem which transferred the IP information report data (step D9), and transmission data processing in the management apparatus is completed. If YES in step D8, transmission data processing in the management apparatus is also completed.

If YES in step D3, the IP information stored in the management apparatus is retrieved by the IP identification information (step D10).

It is checked in step D11 if desired IP information is detected. If YES in step D11, information retrieval reply data is obtained using the detected IP information (step D12), and is transferred to the corresponding subsystem (step D14).

However, if NO in step D11, IP information retrieval reply data indicating non-storage of desired IP information is obtained (step D13), and is transferred to the corresponding subsystem (step D14).

With the above operation, the transmission data processing in the management apparatus is completed.

Figure 8:
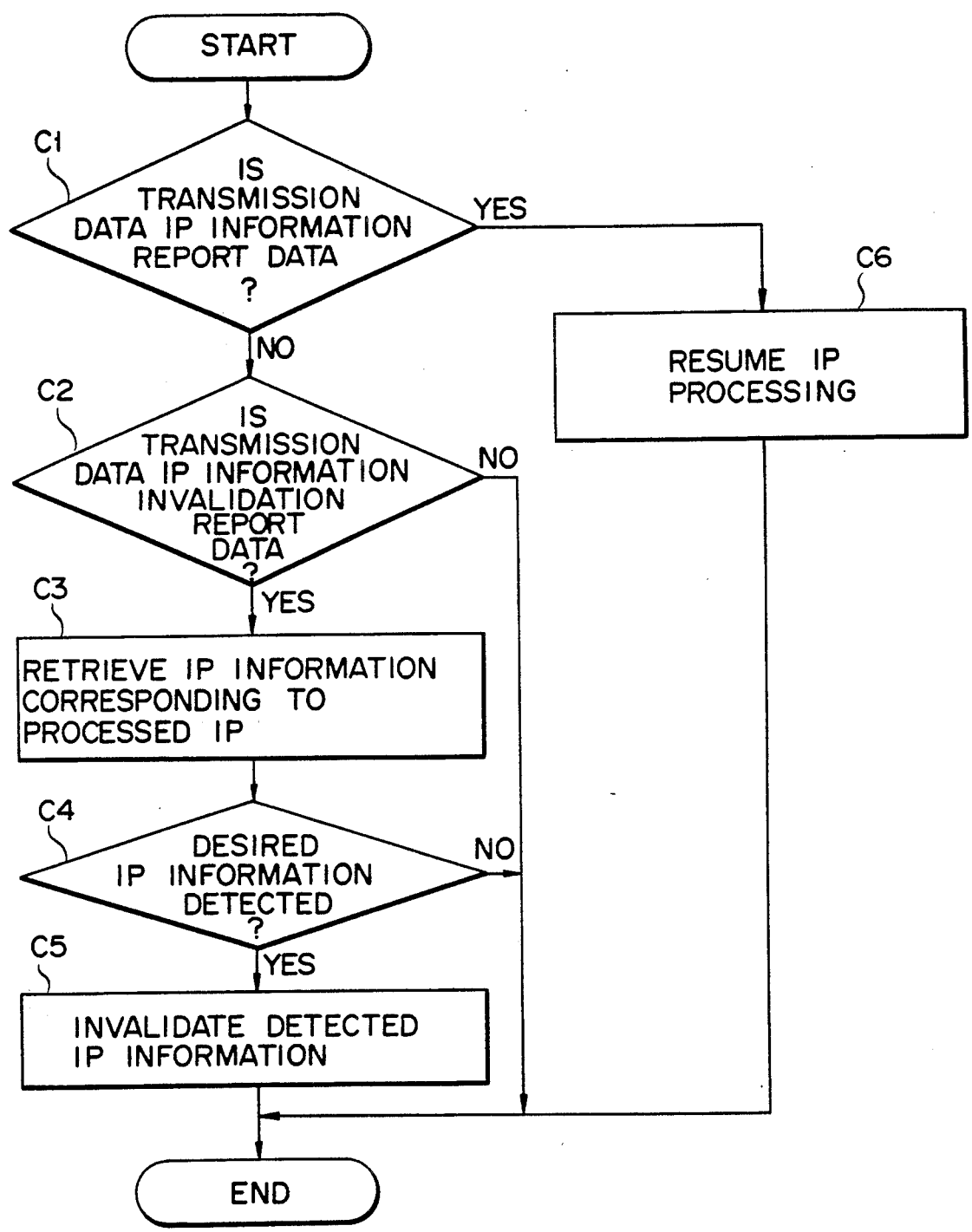
FIG. 8 is a flow chart showing transmission data processing in the subsystem.

FIG. 8 is a flow chart of transmission data processing in each subsystem.

It is checked in step C1 if transmission data from the management apparatus is IP information retrieval reply data. If YES in step C1, IP processing is resumed (step C6).

If NO in step C1, it is checked in step C2 if the transmission data from the management apparatus is IP information invalidation report data. If YES in step C2, IP information corresponding to the processed IP is retrieved (step C3). If NO in step C2, the transmission data processing in the subsystem is completed.

It is checked in step C4 if desired IP information is detected. If YES in step C4, the detected IP information is invalidated (step C5), and transmission data processing in the subsystem is completed. If NO in step C4, the transmission data processing in the subsystem is completed.

With the above operation, the transmission data processing in the subsystem is performed.

As described above, since IP information is stored in the subsystems and the management apparatus, the overall system can be efficiently operated. Some storage locations of IP information can be proposed, and can be optimally selected according to an application of the system. In the transmission data processing in management apparatus, if not only IP information is invalidated but also the invalidated IP information is stored or archived, the operation condition of the overall system can be easily monitored.

Figure 9:
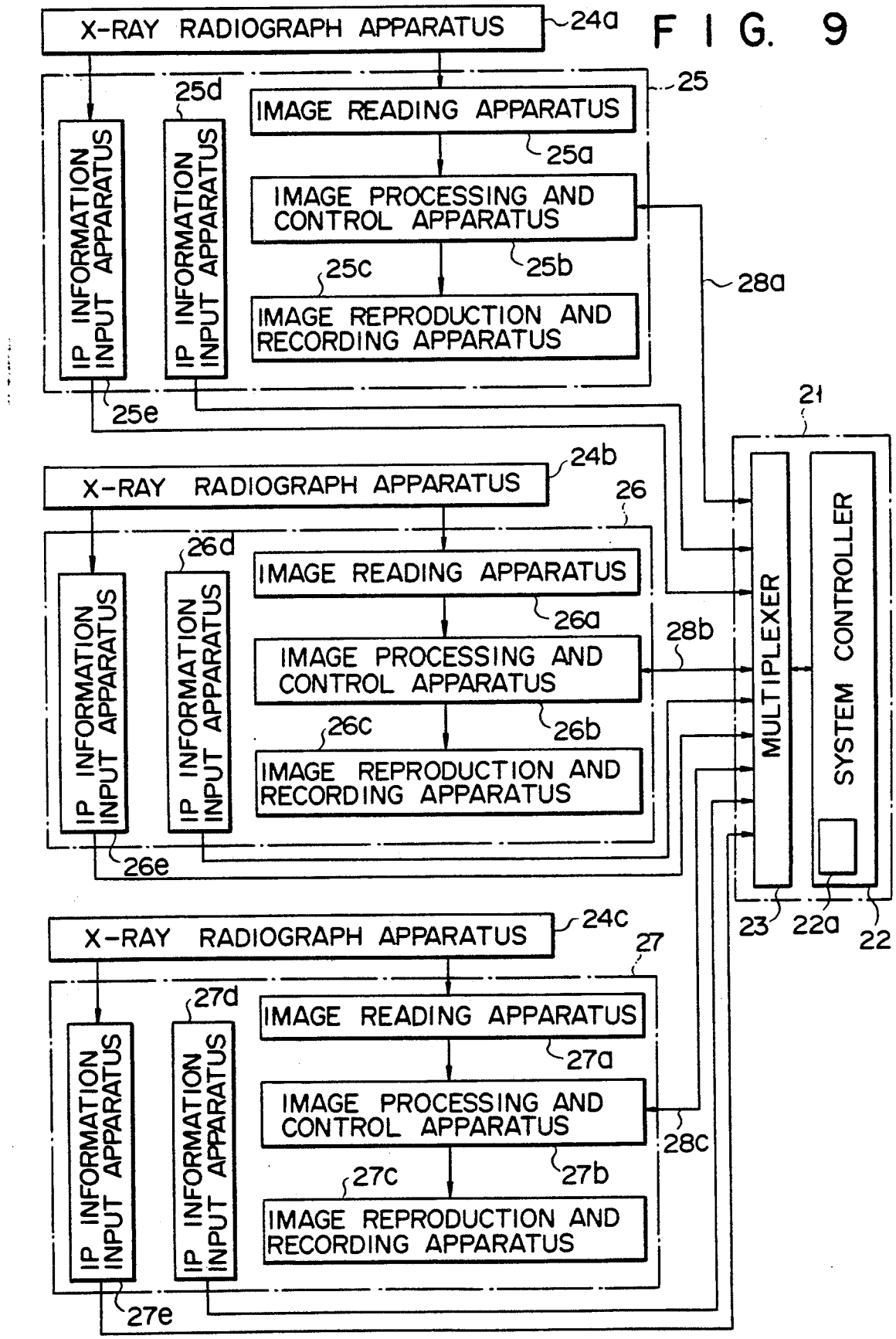
FIG. 9 is a block diagram showing an arrangement of a CR system according to a second embodiment of the present invention.

According to a second embodiment, a system can be constituted such that the IP information input apparatuses are directly connected to the management apparatus, as shown in FIG. 9. If the IP information input apparatuses are connected to the management apparatus outside the subsystems, the IP information input apparatuses can be used as terminal devices.

In the system described above, IP information is input by each IP information input apparatus, and is transferred to the management apparatus. The transferred IP information is stored in the management apparatus, and is also transferred to a predetermined subsystem and is stored therein. In this system, the management apparatus can transfer the received IP information to all the subsystems. More specifically, IP information input from a given IP information input apparatus can be stored in the management apparatus and all the subsystems.

Note that IP input processing, IP processing, transmission data processing, and the like are as described above.

With this system, a plurality of subsystems can be efficiently operated.

The number of IP information input apparatuses can be extended within the capacity of each subsystem, and the IP information input apparatuses can be operated regardless of the connection relationship between themselves and subsystems.

As described above, if waiting times of IP processing of the subsystems are different from each other, independent processing can be performed so that IP processing is performed by a subsystem with a shorter waiting time, thus improving a throughput of the system as a whole.

If a given subsystem malfunctions, IP information input to the corresponding subsystem before the malfunction occurred is also stored in the management apparatus. Therefore, IP processing can be smoothly performed in another subsystem which is free from a malfunction.

If the management apparatus malfunctions, since the subsystems can be independently operated like in the conventional system, the function of the overall system will not be stopped.

Even if a section of the system malfunctions, X-ray image data acquired by radiographing and IP information can always be caused to coincide with each other, and a diagnostic error caused by non-coincidence between X-ray image data and IP information can be prevented.

The embodiments of the present invention have been exemplified. However, the present invention is not limited to the above embodiments, and various changes and modifications may be made within the spirit and scope of the invention.

What is claimed is:

1. A system for processing radiographic image data corresponding to a subject acquired by a computed radiography technique and additional information corresponding to the radiographic image data, the system comprising:
   a plurality of subsystems for storing additional information corresponding to radiographic image data, and processing radiographic image data in accordance with the corresponding additional information, wherein each of said subsystems includes:
   photographing means for storing a radiographic image data in a storage medium by photographing a subject,
   reading means for reading the stored radiographic image data stored by the photographing means,
   getting means for getting additional information, corresponding to the read radiographic image data,
   image-processing means for image-processing the read radiographic image data and the additional information, and
   reproducing and recording means, including a recording medium, for reproducing the stored radiographic image data image-processed by the image-processing means, and for recording the reproduced radiographic image data in the recording medium; and
   management means for transferring the additional information from the subsystems, for modifying the additional information to identify the subsystems for storing the modified additional information, and for managing the subsystems in accordance with the modified additional information.

2. The system according to claim 1, wherein the additional information includes image data identification information for identifying the radiographic image data, subject information for a photographed subject, and photograph information for a photograph condition.

3. The system according to claim 1, wherein the image-processing means includes storing means for storing the additional information.

4. The system according to claim 1, wherein the management means reformats the modified additional information and transfers the reformatted additional information to the subsystems wherein the radiographic image data is image-processed in accordance with the reformatted additional information transferred from the management means.

5. A system for processing radiographic image data corresponding to a subject acquired by a computed radiography technique and additional information corresponding to the radiographic image data, the system comprising:
   getting means for getting the additional information;
   a plurality of subsystems for storing the additional information corresponding to the radiographic image data, and processing the radiographic image data in accordance with the additional information, wherein each of the subsystems includes:
   photographing means for storing the radiographic image data in a storage medium by photographing the subject,
   reading means for reading the radiographic image data,
   image-processing means for image-processing the radiographic image data corresponding to the additional information, and
   reproducing and recording means, including a recording medium, for reproducing the radiographic image data image-processed by the image-processing means, and for recording the reproduced radiographic image data in the recording medium; and
   management means for managing the subsystems, wherein said management means comprises:
   means for identifying the subsystems, means for storing the additional information, and means for managing the subsystems in accordance with the additional information.

6. The system according to claim 5, wherein the additional information includes image data identification information for identifying the radiographic image data, subject information for a photographed subject, and photograph information for a photograph condition.

7. The system according to claim 5 wherein the image-processing means includes storing means for storing the additional information.

8. The system according to claim 7, wherein the radiographic image data is image-processed in accordance with the additional information stored in the image processing means.

9. A method for managing a plurality of subsystems capable of processing of radiographic image data acquired by a computed radiography technique and additional information corresponding to the radiographic image data, wherein each of said subsystems is capable of:
   reading the radiographic image data;
   image-processing the read radiographic image data in accordance with the additional information;
   reproducing the image-processed radiographic image data; and recording the reproduced radiographic image data in a recording medium, the method comprising the steps of:

acquiring, in a first of the subsystems, the radiographic image data by photographing a subject;

storing, in the first of the subsystems, the radiographic image data in a storage medium;

inputting the additional information;

storing in a memory of the first of the sub-systems the additional information corresponding to the acquired radiographic image data;

storing in a second memory the stored additional information and an identification data identifying the first of the subsystems;

selecting from the additional information corresponding to the acquired radiographic image data stored in the memory of the first of the subsystems and the second memory, the additional information to be used to process the radiographic image data;

processing, by the first of the subsystems, the radiographic image data in accordance with the selected additional information.

10. The method of claim 9, wherein the additional information includes image data identification information for identifying the radiographic image data, subject information for a photographed subject, and photograph information for a photograph condition.

11. The method of claim 9, wherein the selecting step includes the steps of:

retrieving the additional information stored in the memory of the first of the subsystems and the second memory to obtain desired additional information;

invalidating the desired additional information stored in the second memory when the desired additional information is obtained from the memory of the first of the subsystems; and transferring the desired additional information stored in the second memory to the memory of the first of the subsystems, and storing the desired additional information in the memory of the first of the subsystems when the desired additional information is obtained from the second memory.

* * * * *